United States Patent
He et al.

(10) Patent No.: US 11,061,778 B2
(45) Date of Patent: Jul. 13, 2021

(54) RESTORATION OF A MESSAGING APPLICATION

(71) Applicant: INTERNATIONAL BUSINESS MACHINES CORPORATION, Armonk, NY (US)

(72) Inventors: Jenny J. He, Chandler's Ford (GB); Jane C. Mitchell, Waterlooville (GB); Gwydion Tudur, Eastleigh (GB); Ernest Bartosevic, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 16/251,128

(22) Filed: Jan. 18, 2019

(65) Prior Publication Data

US 2020/0233753 A1 Jul. 23, 2020

(51) Int. Cl.
| | |
|---|---|
| *G06F 11/14* | (2006.01) |
| *H04L 29/12* | (2006.01) |
| *G06F 11/34* | (2006.01) |
| *H04M 1/27457* | (2020.01) |

(52) U.S. Cl.
CPC ...... *G06F 11/1458* (2013.01); *G06F 11/1448* (2013.01); *G06F 11/3476* (2013.01); *H04L 61/1594* (2013.01); *H04M 1/27457* (2020.01); *G06F 2201/835* (2013.01)

(58) Field of Classification Search
CPC ............. G06F 11/1458; G06F 11/1448; G06F 11/3476; G06F 2201/835; H04L 61/1594
USPC ........................................................ 711/162
See application file for complete search history.

(56) References Cited

U.S. PATENT DOCUMENTS

| | | | | |
|---|---|---|---|---|
| 8,364,640 | B1 * | 1/2013 | Beatty ................. | G06F 11/1469 707/640 |
| 8,495,147 | B1 * | 7/2013 | Lang ................... | H04M 3/5335 709/206 |
| 8,984,066 | B2 * | 3/2015 | Lee ....................... | H04L 12/189 709/206 |

(Continued)

FOREIGN PATENT DOCUMENTS

| | | |
|---|---|---|
| CN | 103885858 B | 5/2017 |
| CN | 106850974 A | 6/2017 |
| CN | 107273242 A | 10/2017 |

OTHER PUBLICATIONS

"Back up weChat Contacts List on iPhone 8 to PC", Wechat Data Recovery, Share WeChat data recovery tool, WeChat using tips etc. for you a better use of WeChat, Jun. 8, 2018, pp. 1-5, http://wechat-data-recovery.com/2018/05/17/back-up-wechat-contacts-on-iphone-8/.

(Continued)

*Primary Examiner* — Hua J Song
(74) *Attorney, Agent, or Firm* — Teddi E. Maranzano

(57) ABSTRACT

A computer implemented method is provided for restoring a device from a backup copy. If the device has a messaging application installed on the device, then a list of contacts for the messaging application on the device is extracted. A request is transmitted to each contact in the list of contacts, the request comprising a user id for the messaging application and a timestamp for the backup copy. One or more replies are received back from one or more of the contacts, each reply comprising messaging content, and the received messaging content is combined with content present in the messaging application on the device.

18 Claims, 5 Drawing Sheets

(56) References Cited

U.S. PATENT DOCUMENTS

2007/0099610 A1     5/2007  Kim et al.
2019/0332692 A1*  10/2019  Rachapudi .......... G06F 16/1844

OTHER PUBLICATIONS

"Backup and Recovery", All Solutions by Function, Jun. 8, 2018, pp. 1-12, Commvault, https://www.commvault.com/solutions/by-function/data-protection-backup-and-recovery.
Hall, "How to backup and Restore WhatsApp Chat History", Cloudwards, Jun. 8, 2018, pp. 1-29, https://www.cloudwards.net/how-to-backup-and-restore-your-whatsapp-chat-history/.
"Gossip data dissemination protocol", https://hyperledger-fabric.readthedocs.io/en/release-1.0/gossip.html, Accessed on Oct. 11, 2018, 2 pages.

* cited by examiner

RESTORATION OF A MESSAGING APPLICATION

BACKGROUND

The present invention relates to a method, system and computer program product for restoring a messaging application on a device.

SUMMARY

According to a first aspect of the present invention, there is provided a computer implemented method comprising restoring a device from a backup copy, determining whether the device has a messaging application installed on the device, extracting a list of contacts for the messaging application on the device, transmitting a request to each contact in the list of contacts, the request comprising a user id for the messaging application and a timestamp for the backup copy, receiving one or more replies from one or more of the contacts, each reply comprising messaging content, and combining the received messaging content with content present in the messaging application on the device.

According to a second aspect of the present invention, there is provided a data processing system comprising a processor arranged to restore a device from a backup copy, determine whether the device has a messaging application installed on the device, extract a list of contacts for the messaging application on the device, transmit a request to each contact in the list of contacts, the request comprising a user id for the messaging application and a timestamp for the backup copy, receive one or more replies from one or more of the contacts, each reply comprising messaging content, and combine the received messaging content with content present in the messaging application on the device.

According to a third aspect of the present invention, there is provided a computer program product for controlling a data processing system comprising a processor, the computer program product comprising a computer readable storage medium having program instructions embodied therewith, the program instructions executable by the processor to cause the processor to restore a device from a backup copy, determine whether the device has a messaging application installed on the device, extract a list of contacts for the messaging application on the device, transmit a request to each contact in the list of contacts, the request comprising a user id for the messaging application and a timestamp for the backup copy, receive one or more replies from one or more of the contacts, each reply comprising messaging content, and combine the received messaging content with content present in the messaging application on the device.

BRIEF DESCRIPTION OF THE DRAWINGS

Preferred embodiments of the present invention will now be described, by way of example only, with reference to the following drawings, in which.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
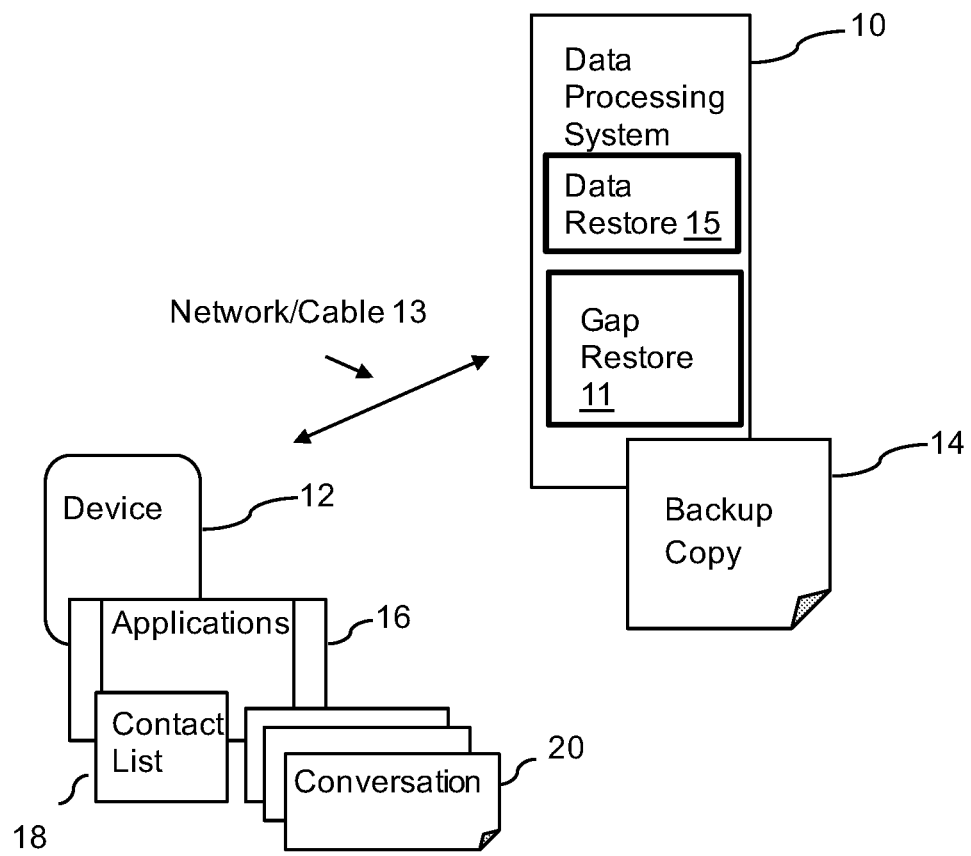
FIG. 1 is a schematic diagram of a data processing system and a device.

With reference now to the Figures, FIG. 1 is schematic diagram of a data processing system (system) 10, which is either directly connected to a device 12 (such as a smartphone), such as by a cable, or is in communication with the device 12 via a network 13. The system 10 stores a backup copy 14 of the data that is stored on the device 12, including photos, videos, text, and other files. The backup copy 14 also includes data that applications 16 on the device 12 use as input and/or output. For example, a messaging application can access and modify local data, such as a contact list and one or more conversations 20.

As users increasingly depend on smart devices, the ability to restore personal contents in the event of a device malfunction increasingly concerns the users. For example, a user can restore a device from a backup copy 14 that is stored on physical storage or in Apple® iCloud® space.

Periodically performing a backup up of the device 12 can protect the data from being lost if there is any malfunction of the device 12, for example. Backing up of the device 12 can occur manually, or can be automatically scheduled to occur regularly, such as daily or monthly. However, there exists the possibility that some data will be lost, as any changes on the device since the last backup will not be recovered if the device 12 is restored.

This can impact the performance of the messaging application 16, since the most recent conversations 20 tend to be the most important conversations and the data in the conversations tends to be very recent. Additionally, a messaging application 16 user can have multiple messages in multiple conversations from the current day, which may not be captured in an older backup copy 14. It may be common for a messaging application 16 to push data onto the device 12 directly, without storing a copy on a central messaging server. This puts the responsibility on the user to back up the data, since this service is not included in the messaging application.

For example, messaging application 16, such as WhatsApp® or WeChat®, may push messages, images, and voice messages onto the user's device 12 then delete the data from the server. Consequently, when restoring from a backup copy 14, the user can potentially lose the conversation content that is not backed up. This is undesirable for most users, since the most recent data may include logistics for a meeting, such as date, time, and location. Conversations started after the time of the most recent backup 14 may be lost in their entirety.

The system 10 includes a gap restore program 11 that can be invoked during the restoration of a backup copy 14. The gap restore program 11 detects a data gap within a messaging application 16, and restores the missing data content when a gap is detected on the device 12. The gap restore program 11 may communicate through an application programming interface (API) of the messaging application 16. The API may define the format of the messaging content of the conversation 20. For example, the API may indicate that the messaging content comprising the conversation 20 are linked together by a timestamp, address, sequence number, etc. Therefore, a missing sequence number, or an end address/timestamp that is not matched with a corresponding start address/timestamp, may indicate a gap in a conversation 20.

When the restoration from a backup copy 14 is finished and the gap restore program detects a gap in one or more conversations 20, the gap restore program 11 retrieves the contact list 18 for the messaging application 16 from the device 12. The gap restore program 11 forms and sends out requests to those contacts, requesting that the devices of these contacts check if there were any conversations that happened during the gap period. If one or more devices report that conversations did occur, the contact's device 12 sends a copy of the conversations to the requesting device 12 for the gap restore program 11 to integrate into the conversation stream. In this way, the consistency and completeness of the restoration is improved.

Figure 2:
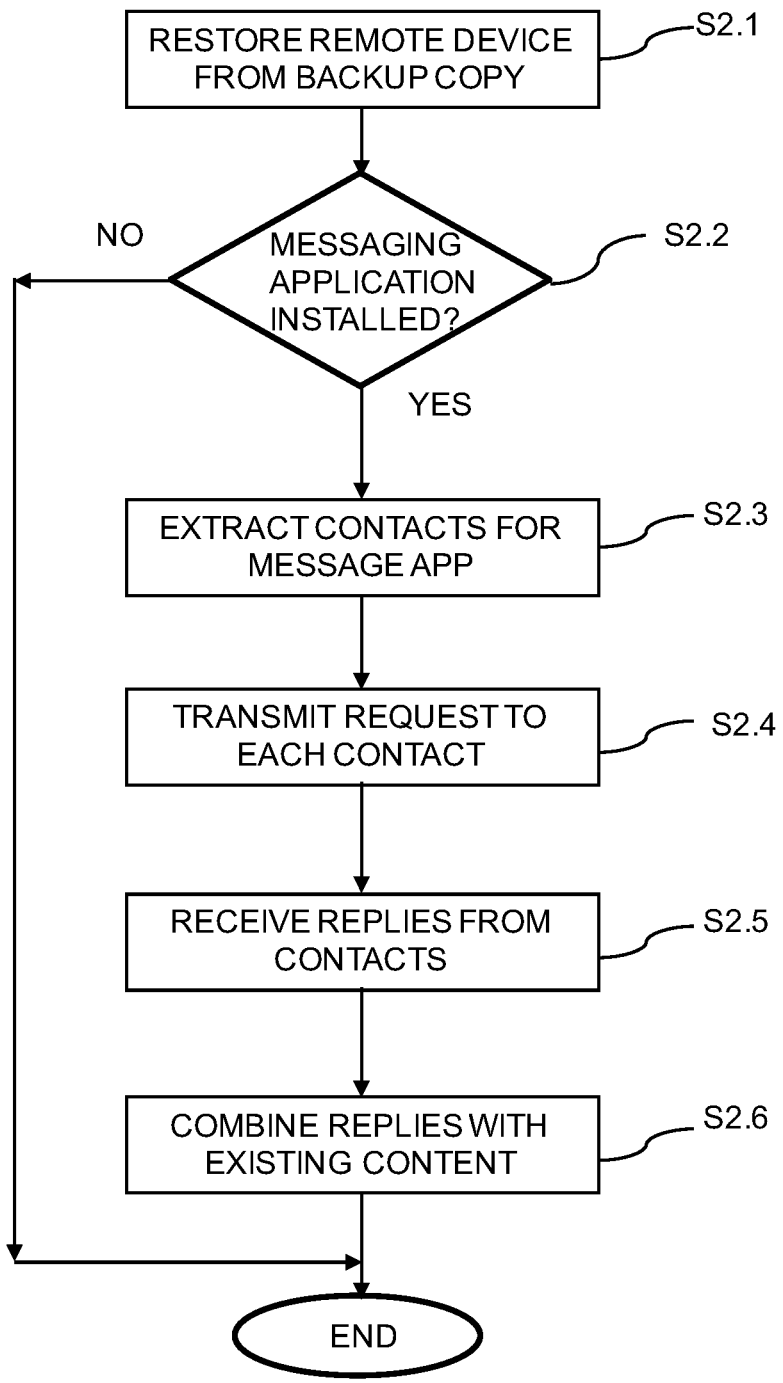
FIG. 2 is a flowchart of a method of performing a restoration process.

FIG. 2 illustrates a flow diagram of an example method of operation according to example embodiments. In step S2.1, a restore process retrieves the desired backup copy 14 from system 10 storage, and restores the device 12 from the retrieved backup copy 14. The restore process includes a data restore program 15 on the system 10. Alternatively, the restore process may be a separate utility, or program that is installed on the device 12 and is provided by the user's Internet, cloud, or similar, service provider. In step S2.2, the gap restore program 11 determines whether the device 12 has a messaging application 16 installed on the device 12. If the device 12 does not have a messaging application installed, then the method terminates at this point. However, if so, then the method proceeds to step S2.3, which comprises extracting a contact list 18 for the messaging application 16 on the device 12. The contact list 18 is used to obtain access to messages that are part of conversations 20 being restored, but that are not present in the backup copy 14.

In step S2.4, the gap restore program 11 formats and transmits a request to contacts in the contact list 18. The gap restore program 11 may communicate with the messaging application 16 using the API in the messaging application 16. The gap restore program 11 may identify missing messaging content for one or more messages. In that case, the gap restore program 11 may identify the participants in the conversation 20 for which missing messaging content is being requested, and sent requests only those contacts participating in the conversation 20. Sending out this reduced number of requests may tend to limit unnecessary network traffic. Alternatively, the requests may be sent to all contacts in the contact list 18. This approach tends to insure that missing messaging content will be located. For example, the gap restore program 11 may seek missing messaging content for a conversation 20 apparently occurring between a subset of the contacts. However, if the gap restore program 11 only transmits requests to the contacts identified as participants, a contact may be overlooked. This may occur, for example, if a contact only appears in one missing messaging content. That contact's participation in the conversation 20 would be unknown. Consequently, the conversation 20 may not be completely restored.

The request includes a user id for the messaging application 16 and a timestamp for the backup copy 14. The gap restore program 11 may retrieve the user id from the profile or configuration of the messaging application 16 on the user's device 12. Alternatively, the user may input the user id as part of the restoration process. This may be useful where the device 12 has more than one messaging application 16 installed, and is therefore, potentially associated with more than one user id. The timestamp may be stored with the backup copy 14 as metadata, or may be stored separately in a database containing information describing the backups that are available to restore. The user id and timestamp are needed so that the contacts that receive the request can identify the source of the request. For security purposes, the requests may include a password, key, or similar security measure. This provides additional assurance that the request originates from a known entity. The requests include a timestamp associated with the missing message content. The request also includes a second timestamp which identifies the time of the backup copy 14 being restored. The two timestamps define a time window during which content is missing for the conversations 20.

Step S2.5 of the method comprises receiving one or more replies from one or more of the contacts, each reply including the requested messaging content. A contact may not have participated in the conversation, or may not have messaging content to contribute. In that case, the reply may indicate that the contact has no messaging content. Finally, step S2.6 of the method comprises combining the received messaging content with content present in the messaging application 16 on the device 12. In this way, messaging content that is not present within the backup copy 14 can be restored to the device 12, since the other parties in the conversations 20 can provide the missing content that occupies the time window between the time that the original backup copy 14 was taken and the time of the restore operation.

The step S2.6 of combining the received messaging content with content present in the messaging application 16 on the device 12 comprises identifying a conversation of the messaging application 16 to which a received reply relates and inserting the respective received messaging content into the identified conversation 20. This means that as far as the user is concerned, the process of obtaining the missing messaging content is seamless and invisible, in that the requests are sent out automatically and the replies that are received are automatically inserted into the correct conversations 20. The user's messaging application content will be updated to include any content dated after the last backup copy 14 but before the time of the actual restore operation. The received messaging content is inserted into the correct conversation based on the structure of messages, as defined by the messaging application. For example, messages may be linked together by pointers (e.g., address pointers) which link a message to the next message in the conversation chain and to the previous message in the conversation. Additionally, messages may be ordered by user id pairs, where the message from a sending user id is paired with the reply from the user id that received it. The correct pairing of the sending and replying user ids can be determined by examining the header information in the message.

Figure 3:
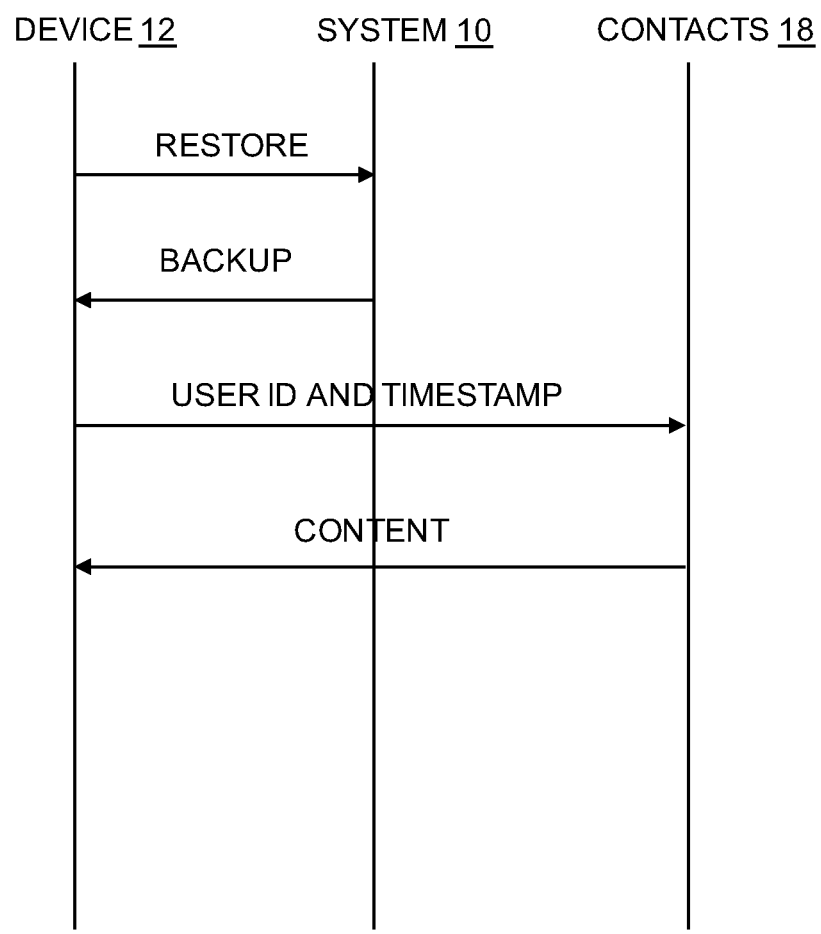
FIG. 3 is a schematic diagram of communications between the system and devices.

FIG. 3 illustrates one embodiment of the communications between the different devices in the restore operation. The first communication is from the device 12 to the system 10 to request the backup copy 14 as part of a restore operation. The second communication is back from the system 10 to the device 12 and comprises the backup copy 14, which is used to restore the device 12. The third communication is/are the communication(s) from the device 12 to the contacts taken from the contact list 18 maintained by the user's messaging application 16. Each of these communication(s) contain as a minimum the user's id and the timestamp of the backup copy 14.

The fourth communication(s) is/are the transmission of one or more replies to the requests sent out to the user's contacts. These replies come back from the contacts to whom requests have been made, with messages that are timed after the time that the backup copy 14 was taken. In this way, the device 12 will have its messaging application 16 brought up to date and any missing messages that are dated after the timestamp of the backup copy 14, and before the time of the request, are obtained and inserted into the messaging conversations 20 maintained by the messaging application 16. Each received reply includes the contact name of the sender and this can be used to identify the correct conversation 20 into which that message or messages can be inserted. A contact may also reply that it does not have content, if none exist matching the request.

Figure 4:
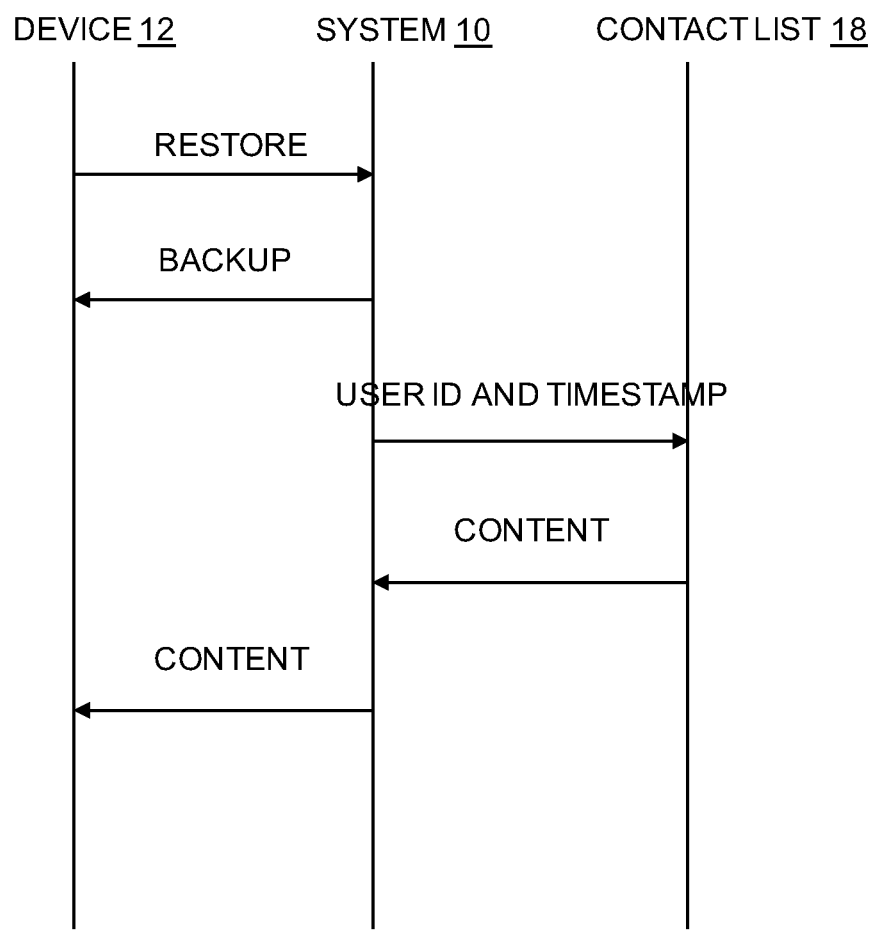
FIG. 4 is a schematic diagram of an alternative set of communications between the system and devices.

FIG. 4 shows an alternative set of communications, which illustrates another embodiment of the communication traffic that is used in the expanded restore operation. In this embodiment, as opposed to that of FIG. 3, the system 10 communicates with the third party contacts, rather than the device 12 communicating with the contacts from the user's contact list 18. The first communication is from the device 12 to the system 10 to request the backup copy 14 as part of a restore operation. The second communication is back from the system 10 to the device 12 and comprises the backup copy 14, which is used to restore the device 12.

The third communication is/are the communication(s) from the system 10 to the contacts taken from the contact list 18 maintained by the user's messaging application 16. Each of these communication(s) contain as a minimum the user's id and the timestamp of the original backup copy 14. The fourth communication(s) is/are the transmission of one or more replies to the requests sent out to the user's contacts. These replies come back from the contacts to whom requests have been made, to the system 10 (rather than directly to the device 10 as in FIG. 3). The system 10 receives the replies from the different contacts, the replies comprising messaging content. As in FIG. 3, a contact may also reply that it does not have content, if none exist matching the request.

The fifth communication is the transmission of the messaging content from the system 10 to the device 12. The messaging content that the system 10 has received from the various third party contacts is brought together as a single message which is then transmitted from the system 10 to the device 12. The device 12 combines the received messaging content with content present in the messaging application 16 on the device 12 by identifying a conversation 20 of the messaging application 16 to which a received reply relates and inserting the respective received messaging content into the identified conversation 20.

Figure 5:
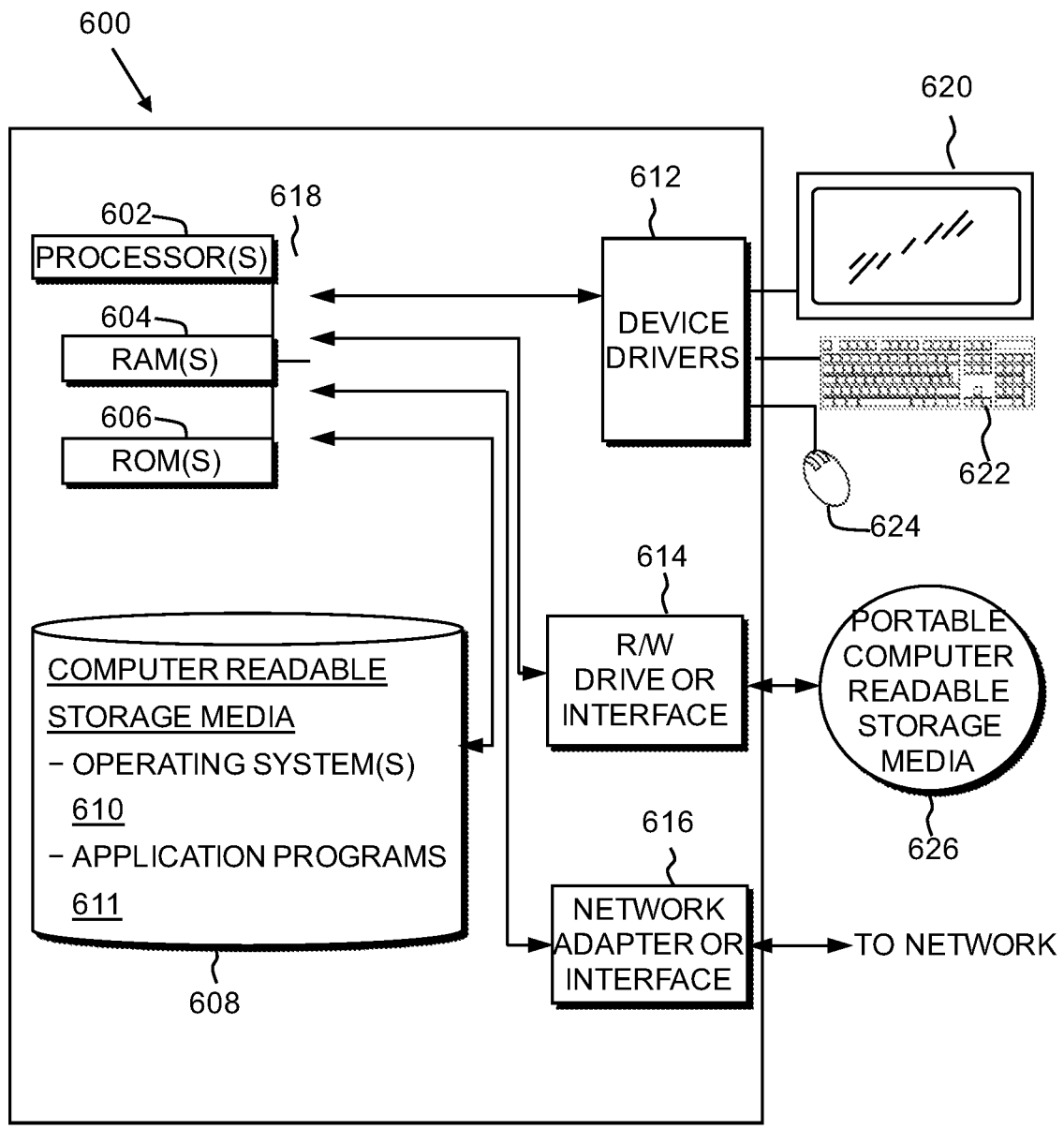
FIG. 5 is a block diagram of an example embodiment of a system in accordance with the present invention.

FIG. 5 depicts a block diagram of components of an example computing device that may provide the form of the data processing system 10 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device 600 can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610, and application programs 611, such as data restore program 15 and gap restore program 11, are stored on one or more of the computer readable storage media 608 for execution by one or more of the processors 602 via one or more of the respective RAMs 604 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 600 can also include a R/W drive or interface 614 to read from and write to one or more portable computer readable storage media 626. Application programs 611 on computing device 600 can be stored on one or more of the portable computer readable storage media 626, read via the respective R/W drive or interface 614 and loaded into the respective computer readable storage media 608.

Computing device 600 can also include a network adapter or interface 616, such as a TCP/IP adapter card or wireless communication adapter. Application programs 611 on computing device 600 can be downloaded to the computing device from an external computer or external storage device via a network (for example, the Internet, a local area network or other wide area networks or wireless networks) and network adapter or interface 616. From the network adapter or interface 616, the programs may be loaded into the computer readable storage media 608. The network may comprise copper wires, optical fibers, wireless transmission, routers, firewalls, switches, gateway computers and edge servers.

Computing device 600 can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614, and network adapter or interface 616 can comprise hardware and software stored in computer readable storage media 608 and/or ROM 606.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method comprising:
   determining that a device has a messaging application installed;
   extracting a list of contacts defined in the messaging application;
   transmitting a request to each contact in the list of contacts, the request comprising at least a user id for the messaging application and a timestamp corresponding to the timestamp of a backup copy;
   receiving one or more replies from one or more of the contacts, each reply comprising messaging content or an indication that the contact has no content available; and
   combining the received messaging content with content present in the messaging application on the device, wherein the combining is based on pairing sender and replying user ids from message header information, based on pairing linking pointers, or based on matching timestamps in content present in the messaging application with received messaging content, thereby, resulting in a complete message.

2. A method according to claim 1, wherein combining the received messaging content with content present in the messaging application on the device comprises identifying a conversation of the messaging application to which a received reply relates and inserting the respective received messaging content into the identified conversation.

3. A method according to claim 2, wherein the received messaging content is inserted into the identified conversation by linking pointers in each of the received messaging content to the content present in the messaging application.

4. A method according to claim 1, wherein the request further comprises a timestamp for restoring the device from the backup copy.

5. A method according to claim 1, further comprising receiving one or more replies from one or more of the contacts, each reply comprising messaging content comprises receiving a reply comprising text, images and/or videos.

6. A method according to claim 1, wherein the request further comprises an identifier indicating that the request is a restoration type request.

7. A computer system, comprising one or more computer processors; one or more computer readable storage media; computer program instructions, the computer program instructions being stored on the one or more computer readable storage media for execution by the one or more computer processors, and causing the one or more computer processors to execute the method comprising:
 determining that a device has a messaging application installed;
 extracting a list of contacts defined in the messaging application;
 transmitting a request to each contact in the list of contacts, the request comprising at least a user id for the messaging application and a timestamp for a backup copy;
 receiving one or more replies from one or more of the contacts, each reply comprising messaging content or an indication that the contact has no content available; and
 combining the received messaging content with content present in the messaging application on the device, wherein the combining is based on pairing sender and replying user ids from message header information, based on pairing linking pointers, or based on matching timestamps in content present in the messaging application with received messaging content.

8. A system according to claim 7, wherein combining the received messaging content with content present in the messaging application on the device, to identify a conversation of the messaging application to which a received reply relates and insert the respective received messaging content into the identified conversation.

9. A system according to claim 8, wherein the received messaging content is inserted into the identified conversation by linking pointers in each of the received messaging content to the content present in the messaging application.

10. A system according to claim 7, wherein the request further comprises a timestamp for restoring the device from the backup copy.

11. A system according to claim 7, further comprising receiving one or more replies from one or more of the contacts, each reply comprising messaging content, to receive a reply comprising text, images and/or videos.

12. A system according to claim 7, wherein the request further comprises an identifier indicating that the request is a restoration type request.

13. A computer program product for controlling a data processing system comprising a processor, the computer program product comprising a computer readable storage medium having program instructions embodied therewith, the program instructions executable by the processor to cause the processor to:
 restore a device from a backup copy;
 determine whether the device has a messaging application installed on the device;
 extract a list of contacts for the messaging application on the device;
transmit a request to each contact in the list of contacts, the request comprising a user id for the messaging application and a timestamp for the backup copy;
 receive one or more replies from one or more of the contacts, each reply comprising messaging content; and
 combine the received messaging content with content present in the messaging application on the device, wherein the combine is based on pairing sender and replying user ids from message header information, based on pairing linking pointers, or based on matching timestamps in content present in the messaging application with received messaging content.

14. A computer program product according to claim 13, wherein the instructions for combining the received messaging content with content present in the messaging application on the device comprises instructions for identifying a conversation of the messaging application to which a received reply relates and inserting the respective received messaging content into the identified conversation.

15. A computer program product according to claim 13, wherein the request further comprises a timestamp for the restoring of the device from the backup copy.

16. A computer program product according to claim 13, wherein the instructions for receiving one or more replies from one or more of the contacts, each reply comprising messaging content comprises instructions for receiving a reply comprising text, images and/or videos.

17. A computer program product according to claim 13, wherein the request further comprises an identifier indicating that the request is a restoration type request.

18. A computer program product according to claim 13, wherein the received messaging content is inserted into the identified conversation by linking pointers in each of the received messaging content to the content present in the messaging application.

* * * * *